A. H. EMERY.
DISAPPEARING GUN CARRIAGE.
APPLICATION FILED MAR. 13, 1905.

1,012,618.

Patented Dec. 26, 1911.
8 SHEETS—SHEET 1.

WITNESSES:

INVENTOR
Albert H. Emery
BY Knight Bros
ATTORNEYS.

A. H. EMERY.
DISAPPEARING GUN CARRIAGE.
APPLICATION FILED MAR. 13, 1905.

1,012,618.

Patented Dec. 26, 1911.
8 SHEETS—SHEET 6.

WITNESSES:
J. M. Wynkoop
Jno. C. Adams

INVENTOR
Albert H. Emery
BY Knight Bros
ATTORNEYS.

COLUMBIA PLANOGRAPH CO., WASHINGTON, D. C.

A. H. EMERY.
DISAPPEARING GUN CARRIAGE.
APPLICATION FILED MAR. 13, 1905.

1,012,618.

Patented Dec. 26, 1911.
8 SHEETS—SHEET 7.

WITNESSES:

INVENTOR
Albert H. Emery
BY
Knight Bros
ATTORNEYS.

UNITED STATES PATENT OFFICE.

ALBERT H. EMERY, OF STAMFORD, CONNECTICUT.

DISAPPEARING GUN-CARRIAGE.

1,012,618.   Specification of Letters Patent.   Patented Dec. 26, 1911.

Application filed March 13, 1905. Serial No. 249,940.

*To all whom it may concern:*

Be it known that I, ALBERT H. EMERY, a citizen of the United States, residing at Stamford, in the county of Fairfield and State of Connecticut, have invented certain new and useful Improvements in Disappearing Gun-Carriages, of which the following is a specification.

My invention relates to carriages used for siege guns and coast defense purposes and of the kind commonly known as disappearing carriages and more especially those in which a link system is used to raise the gun from loading to firing position and a link system is also used to control the angle of elevation of the gun.

My invention relates to improvements in counter balancing the gun to raise it from loading to firing position, which is accomplished by the use of springs and an accumulator in a way to utilize part of the force of recoil to raise the gun.

My invention relates also to the method of constructing and arranging and operating the accumulator, counter balancing springs and recoil and elevating presses.

My invention relates also to the construction and arrangement of the reservoirs and the pipes and valves for the recoil and elevating presses.

It relates also to the details used for traversing the carriage and to the method of protecting different parts of it; also to the means used to measure the angles of traverse.

My invention relates also to the method of constructing the bearings for the trunnions of the gun in a way to make the gun turn more easily on its trunnions.

My invention will be more fully described in the following specification and claims.

My invention is illustrated in the several sheets of drawings, in which,

Fig. 5$^a$ shows the same parts in the same positions, on a larger scale, without the parapet; Fig. 5$^b$ is an elevation partly in vertical axial section, of the recoil press, shown centrally in Figs. 5 and 5$^a$, but with the parts in the positions which they have when the gun is near loading position. Fig. 6 shows in section a portion of the masonry immediately supporting the carriage with a front elevation of the gun in loading position together with the supporting carriage, in which view that portion of the carriage on the right of the axis and above the foundation is shown as made by a cutting plane on the line A A, Figs. 5 and 5$^a$, while that portion of the carriage below the floor and at the right of the axis is shown in elevation. Most of the parts on the left of the axis are shown in section; these sections being principally made by a vertical plane through the axis of the carriage; Figs. 6$^a$ and 6$^b$ show some details mostly in section on a larger scale; Figs. 7$^a$ and 7$^b$ and 7$^c$ show some details on a larger scale; Fig. 8$^b$ shows a section of a water packing used around the trunnion.

Figure 3:
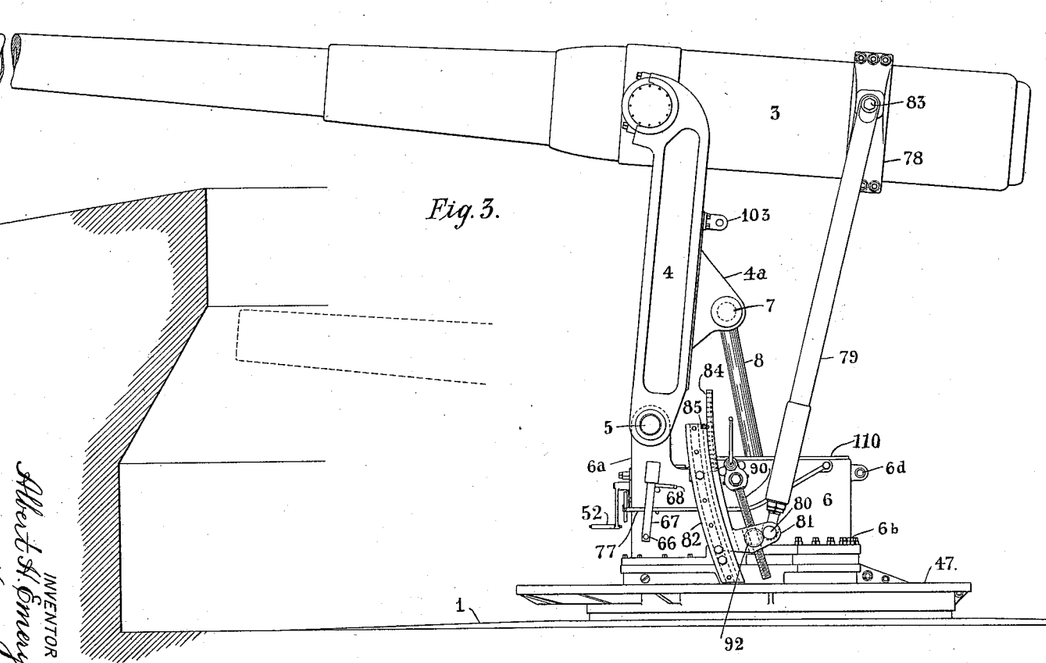
Fig. 3 shows in section a portion of the parapet and side elevation of the gun, and carriage when the gun is in firing position.
Figure 5:
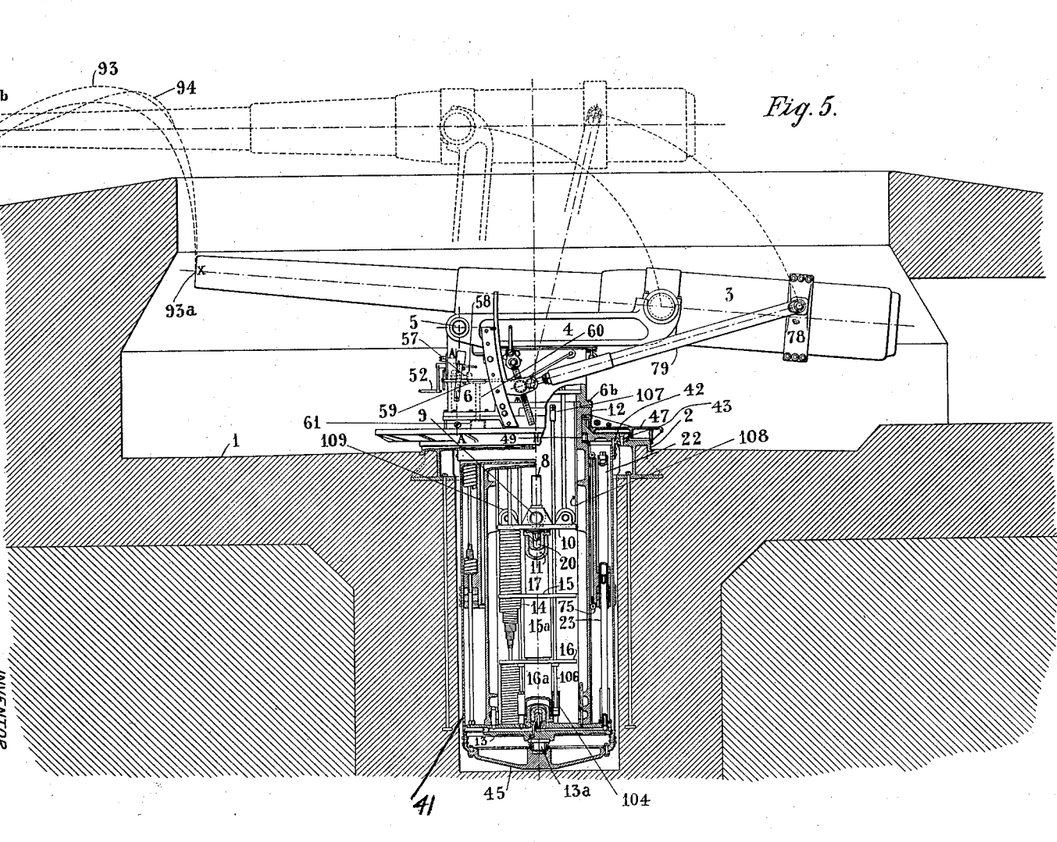
Fig. 5 shows in section the parapet and protecting pit around the gun and carriage, with the gun shown in side elevation, in loading position, in full lines and in firing position at point blank, in dotted lines, while the most of the carriage is shown in side elevation in loading position with some of the parts of the lower part of the carriage in section, the section of the parts on the right of the axis being made by a vertical plane through the axis of the gun: the section of the parts shown on the left being made by a vertical plane through the axis of the carriage and inclined 45 degrees to the other cutting plane.
Figure 5A:
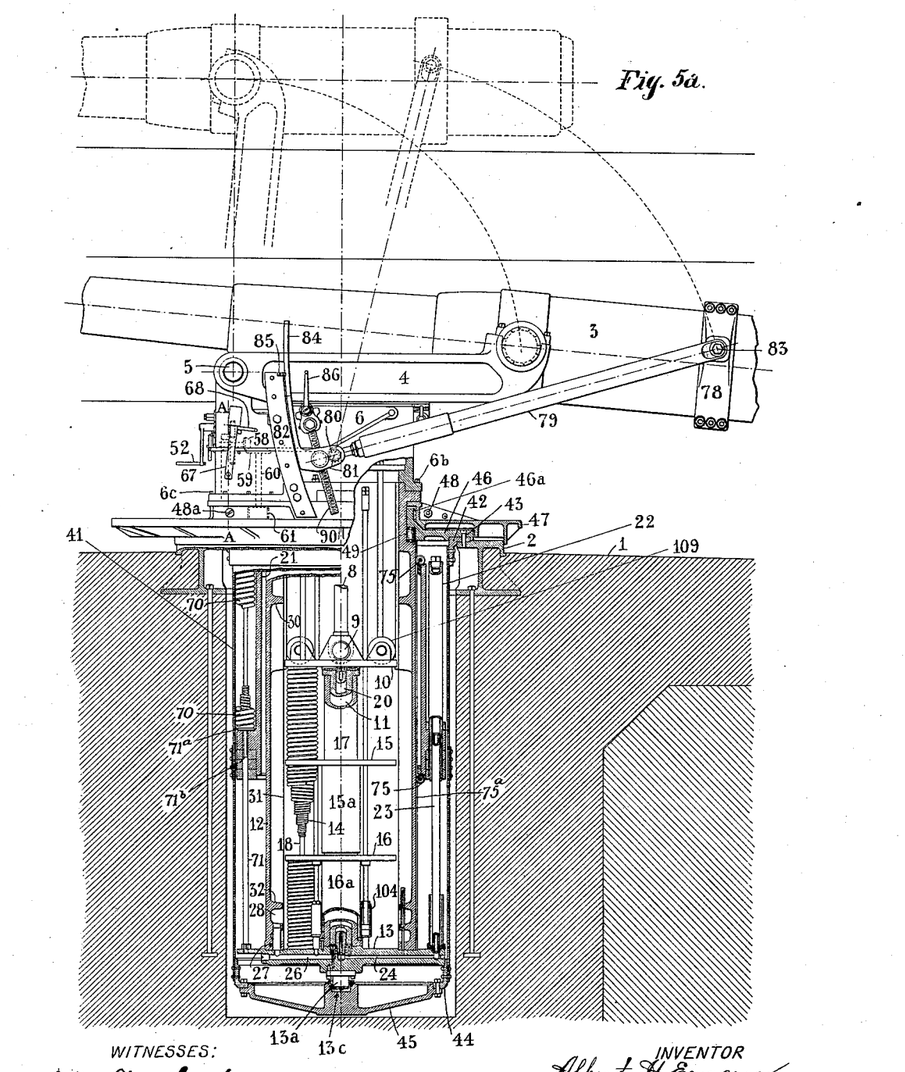
Figure 5B:
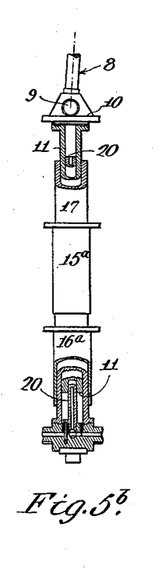
Figures 6, 6A, 6B:
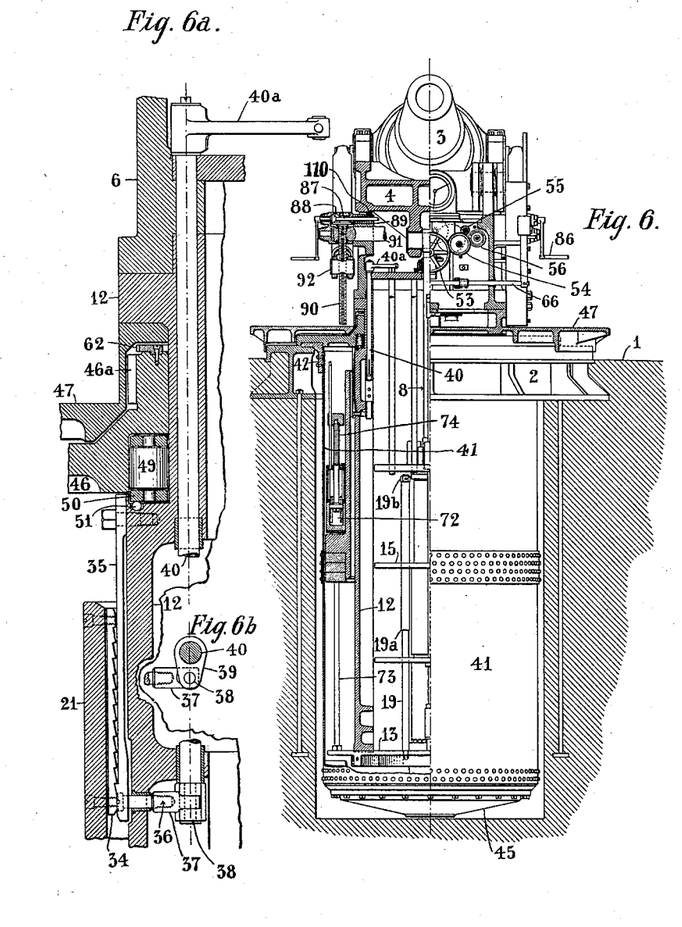

In all the figures 1 represents the masonry in which the carriage sets; 2 the large circular bed plate or foundation ring which sets in the masonry and supports the carriage; 3 is the gun mounted on the carriage; and 4 shows the link system by which the gun is supported and raised from loading to firing position. Both ends of this link are bifurcated; the upper end receiving the trunnions of the gun directly and the lower end being additionally bifurcated on each side to receive the supporting pins 5 by which it is trunnioned to the stanchions 6ᵃ which project from the carriage body 6. The sides of the link are very firmly joined by connecting webs, which help to form a box (shown in section in Fig. 6). They serve to make the link very stiff in all directions. From the lower side of the link projects a pedestal 4ᵃ which carries pin 7 by which the connecting rod 8 is connected at its upper end to the link. (This rod is best seen in Figs. 3 and 5.) The lower end of the rod is connected by pin 9 to the spring piston 10 which is bolted to the upper end of the ram 11 of the recoil press, which is set vertically in the center of the spring chamber 12 on the lower head 13 of this chamber. The upper end of the spring chamber 12 which is best made in the cylindrical form shown, is bolted by bolts 6ᵇ to the carriage body 6 which it carries. The lower head 13 of the spring chamber 12 stands on the pivot 13ᵃ (see Fig. 7), on anti-friction plates 13ᵇ set in a bronze socket 13ᶜ. These anti-friction plates 13ᵇ are best made of hardened polished steel with brass or bronze plates between them. These plates should be several in number and each plate should be very carefully ground to uniform thickness, as any thicker part would receive undue pressure. The gun is mainly supported in all positions by counter balancing springs 14, some of which are shown in Figs. 5 and 5ᵃ where three series of vertical compression springs are shown separated from each other by pistons 15 and 16, the latter having guide sleeves 15ᵃ and 16ᵃ which fit the recoil press cylinder 17 to keep the separating pistons 15 and 16 from tipping as they move up and down along the recoil press in the opening and shutting of these counter balancing springs. It will readily be seen that as the link rises rotating around the pin 5, the pressure on the springs through the connecting rod 8 from the weight of the gun will be less and less as the gun rises, until it will be nothing when the axis of the trunnions is directly over the axis of the pins 5. Each of the three series of springs shown are made by several sets of springs which are best symmetrically arranged around the recoil press and kept in position by vertical guide rods 18 around which the different members of each set are placed. By dividing the springs into three or more series they are the more readily made to counter balance the gun in all positions by using two or more stop rods 19 (one of which is shown in Fig. 6). Shoulders 19ᵃ and 19ᵇ on these rods successively stop the pistons 16 and 15 in their upward movement when the gun is being raised to firing position. These counter balancing springs may be made sufficient in power to over balance the weight of the gun and friction of the moving parts and cause the gun to rise readily from loading to firing position, in which case the gun remains there until the recoil of firing carries it down again when latches would be used to catch and hold the gun down until they are tripped to allow the gun to rise to firing position, but since the gun must always go to one place for loading and the recoil from the same charge will vary at different angles of firing to say nothing of the trouble from different charges, there is a great difficulty in making the gun recoil to the same position and sometimes it fails to go down to loading position, at other times it comes down with destructive effect, the recoil resistance not having been sufficient to stop the gun. This difficulty is so great that a radical change should be made in counter balancing the gun and the springs should not be sufficient to raise the gun or even to hold it in any position, so that when the gun is stopped in any part of its path, its weight will overcome the pressure of these springs and the friction of the moving parts and move, whenever the pressure of the liquid in the recoil presses is slight, down to loading position.

Figure 7:
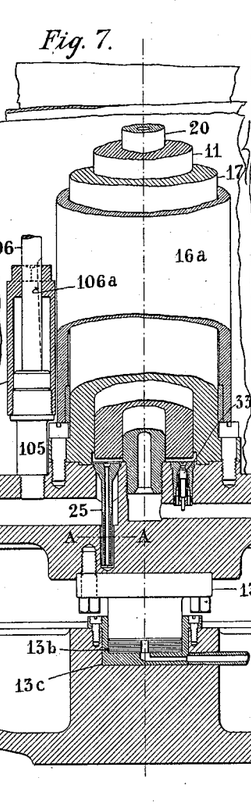
Fig. 7 shows the lower part of the carriage in section with some of the parts removed.
Figures 7A, 7B:
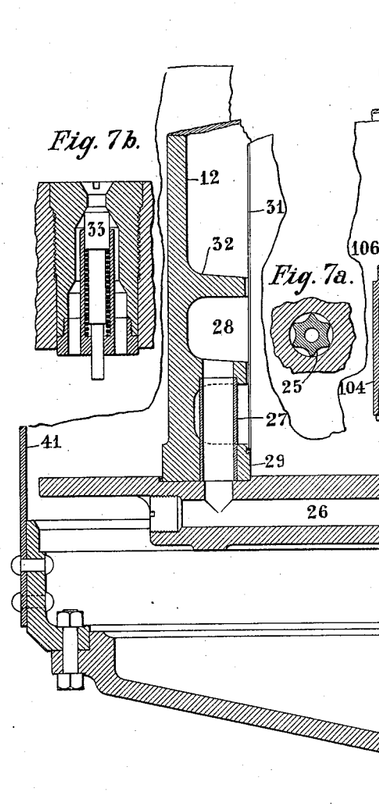

In the drawings shown, the ram 11 of the recoil press 17 has an inner ram 20 secured to the head 13 of the spring cylinder. There is a central opening in this ram 20 through which the liquid is forced from the accumulator to cause the elevating press to carry the gun from loading to firing position. This accumulator may be either a weight or spring accumulator and may be placed in any suitable position. I prefer for this accumulator a counter balancing weight 21 which is shown in the drawings as a large cylindrical heavily flanged casting surrounding the spring cylinder 12. This weight is carried by two hydraulic presses 22 which are bolted to the flange. The rams 23 of the presses which raise the accumulator weight are threaded to secure them to the lower head 13 of the spring cylinder. One of these presses and its ram is shown partly in section and partly in elevation in Figs. 5 and 7. When recoil takes place the liquid from the elevating press 20 is forced through passages 24 into the cylinder 22 causing the accumulator weight 21 to rise and store power to be used later in raising the gun to firing position, the elevating press thus assisting the main recoil press in checking the recoil of the gun. The recoil of the gun should, in general, be checked before it fully reaches loading position. When this is done the liquid from the elevating or central recoil press, whichever it is called, will be insufficient to fill the presses 22 of the accumulator to the extent necessary to enable them to raise the gun from loading to firing position. The elevating press and main recoil press are best made with concentric rams as shown, the liquid from the outer ram during recoil being forced through a pair of throttling valves 25, and passages 26 in the head 13, and through pipes 27 into the oil chamber 28. Figs. 5, 5$^a$ and 7 show one of these valves 25 passages 26 and pipes 27. On the bottom of the cylinder 12 is a flange 29 bolted to the head 13 with which it makes a tight joint. In the upper part of the spring cylinder is another flange 30. A cylindrical copper lining 31 extends from the flange 29 to the flange 30, to both of which it is fastened by being thoroughly calked in grooves provided therefor. This copper lining, with the outer wall 12 of the spring chamber and its two flanges 29 and 30 constitute a chamber which is nearly full of liquid, best a non-freezable oil, for charging the recoil press. It is full to about even with the top of the recoil press cylinder 17. On the interior of the spring cylinder 12 is the flange 32 with an annular passage way between it and the lining 31. During recoil the oil strikes against this flange which prevents its spurting through the oil above to mix with the air in the upper part of the chamber. The spring chamber is filled with oil to a point somewhat above the top of the press cylinder 17 and above the piston 10 when the ram 11 of the press is down. This oil keeps the springs and other parts contained therein well lubricated. Its use requires the spring pistons 10, 15 and 16 to have large clearance spaces between them and the lining 31, to allow their free movement in this oil. The recoil and elevating presses may be without packing if closely fitted by grinding. Equal heads of oil in the spring chamber and in the chamber around it prevent flow between the two chambers and with the close fitting mentioned there is no noticeable leakage between the recoil and elevating presses. In raising the gun to firing position through the action of the counter balancing springs and the accumulator 21, the oil from the chamber 28 flows through the pipes 27 and passages 26 and raising the throttling valves 25, flows into the chamber under the annular ram 11, keeping it full so that when recoil commences it is always full of oil. When the gun has reached firing position with the annular press 17 full, the valves 25 close by their own weight. Fig. 7$^a$ shows a section of one of these valves on line A A, Fig. 7 on a larger scale, and shows the throttling of the oil which has to pass through the small central holes in the valves and the six passages around them formed by their flutings. In rapid recoil the resistance to the flow of the oil is so great part of the time as to cause the pressure under the outer ram to be greater than that under the inner ram and when this is the case the valves 33 which open downward into one of the passages 24, open and allow oil from the outer ram to flow through it to help raise the accumulator weight. This accession of oil added to that of the inner ram causes the accumulator weight 21 to rise quickly nearly or quite to its upper limit of motion at or before the time the gun has fully ceased its recoil. A pair of ratchets 34 and spring latches 35 (shown in Fig. 6$^a$) catch the weight near its upper limit of motion and hold it until tripped to cause the gun to rise to firing position. The ratchets are secured to the upper end of the weight 21 while the spring latches 35 are secured to the spring chamber 12. To cause the gun to rise to firing position, the latches 35 are tripped by bolts 36 screwed in pieces 37 secured by pins 38 to arms 39 which are keyed to shafts 40. Shafts 40 carry rocking arms 40$^a$ at their upper ends and may be rocked in any convenient way to trip the latches.

Figure 4:
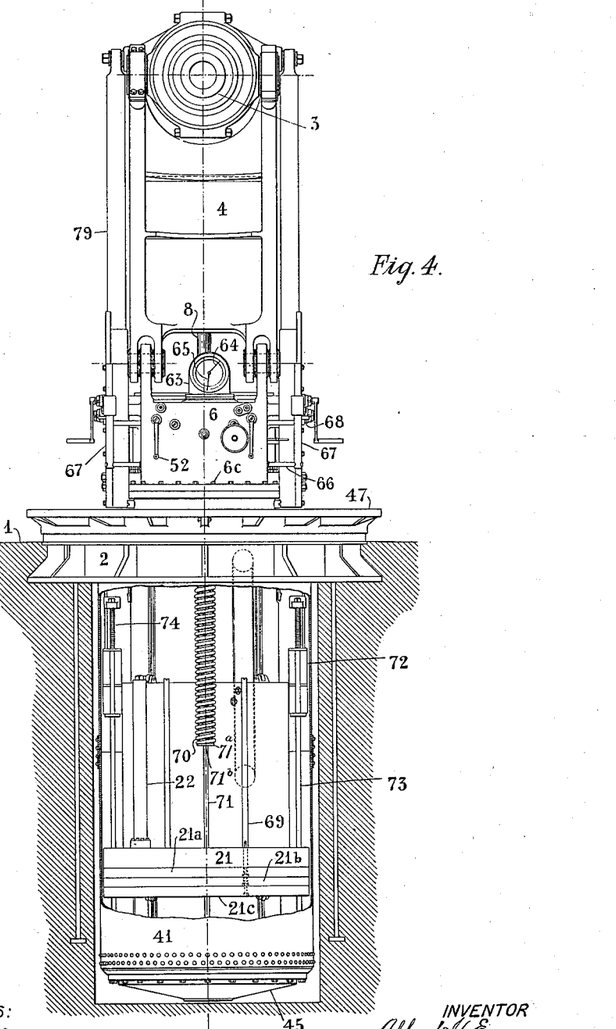
Fig. 4 shows an end elevation looking at the muzzle of the gun which is in firing position at point blank and shows also the masonry which supports it, in section, while the supporting carriage is in elevation with a portion of the steel curb which surrounds the lower part of the carriage broken away to show some of the interior moving parts in elevation.

41 is a steel curb shown in section in Figs. 5, 5$^a$ and 7, part of which is shown in elevation in Figs. 4 and 6. It is riveted to ring 42 at its top, where it is bolted to foundation the ring by bolts 43, and to ring 44 at the bottom, where it is bolted to the lower head 45 which may or may not rest on the masonry, as preferred.

The two part plate 47 secured together by bolts 48 and 48$^a$ forms a moving floor to the carriage on which the operators who work the carriage stand. Bolts 6$^b$ which secure the carriage body 6 to the spring cylinder 12 and bolts 6$^c$ secure this moving platform in position. By removing the bolts 6$^b$, 6$^c$, 48 and 48$^a$ this platform can be removed to inspect the moving parts.

The two part plate 46 which covers the accumulator weight is stationary while all the parts interior to the curb including the spring cylinder and the carriage body and floor 47 can be revolved on the pivot 13$^a$.

The spring cylinder 12 is kept from tipping by rollers 49, shown in Fig. 5, but better on a larger scale in Fig. 6$^a$ where they are shown with trunnions at each end resting in bronze housing rings 50 to keep them vertical and at a proper distance from each other. Small steel balls 51 carry the weight of these housings and rollers 49. These rollers are of hardened steel, turned and ground to exact size to rest on the curved dressed roller paths of the spring chamber 12 and the two part plate 46, and are of such size as to permit no tipping of the spring cylinder 12. Thus all the moving parts of the carriage are easily rotated on the pivot 13ª to do which cranks 52 drive the train of gears, shown in Fig. 6 in full lines and in Figs. 5 and 5ª in dotted lines.

Fig. 6 shows a gear 53 which is driven by idlers 54 the latter being driven directly by pinion 55 and cranks 52, but more rapidly and with less force when the cranks are placed on the shafts which drive larger pinions 56. Shaft 57 which carries the gear 53, carries a bevel pinion 58 which drives gear 59 on shaft 60. The latter carries a pinion 61 which meshes with gear 46ª cut on the two part plate 46 part of which is shown in section in Figs. 5 and 6ª. This plate being stationary, pinion 61 when driven causes the carriage to rotate on the supporting pivot 13ª.

On the top of the two part ring 46, (see Fig. 6ª) is shown a small fine cut gear 62 secured firmly thereto, while on the moving carriage body is an indicator 63 (see Fig. 4). A pinion mounted on a shaft in the moving carriage meshes with the fixed gear 62 and is connected with a train of gears leading to the indicator 63 to cause the two pointers 64 and 65 to revolve when the carriage is rotating. One of these pointers revolves around just once when the carriage makes a complete revolution, while the other revolves 360 times as fast making a complete revolution for each degree the carriage is rotated. By means of this indicator the direction in which the carriage points the gun can be exactly determined and the gun is made to point in any exact plane desired.

The shaft 66 shown in Figs. 3, 4, and 6 passes through the carriage body and carries the arms 67 which are operated by small bent cranks 68 secured thereto by which shaft 66 may be turned about 90 degrees to the left to trip the ratchet latches 35. This shaft is suitably connected to the arms 40ª on the shafts 40 which trip the ratchet latches when it is desired to raise the gun. This connection may be made in any convenient way. The parts which connect shaft 66 with the arms 40ª on shafts 40 are not shown.

Part or all of the supplementary weights 21ª, 21ᵇ 21ᶜ (see Fig. 4), are secured by four rods 69 to the flange on 21 to cause it to have the weight necessary to raise the gun quickly to firing position. To start the gun quickly when it begins to rise from loading to firing position a pair of initially loaded springs 70 working on rods 71 are provided; the initial loading being effected by confining the springs on said rods with some initial compression between their upper abutment and the spring collar 71ª which is limited in its downward movement by shoulders 71ᵇ on said rods. (See Figs. 4 and 5.) These springs act only when the weight 21 is near it upper limit of motion.

That the accumulator weight may not rise too high a pair of hydraulic buffers 72 (see Figs. 4 and 6) are provided, (one of them is shown in section in Fig. 6.) Each is supported by two rods 73 which fix them to the lower head 13 of the spring chamber. They are provided with throttling rods and are returned to position when the weight descends by their own weight and the action of the springs 74. The accumulator weight 21 is guided in its vertical movements by four pairs of rollers 75, one pair of which is shown in Fig. 5 and the lower roller of said pair, in Fig. 7. They run in grooves 75ª in the spring cylinder 12 and prevent the weight 21 from tipping and cause it to turn exactly with the spring cylinder.

Figure 7C:
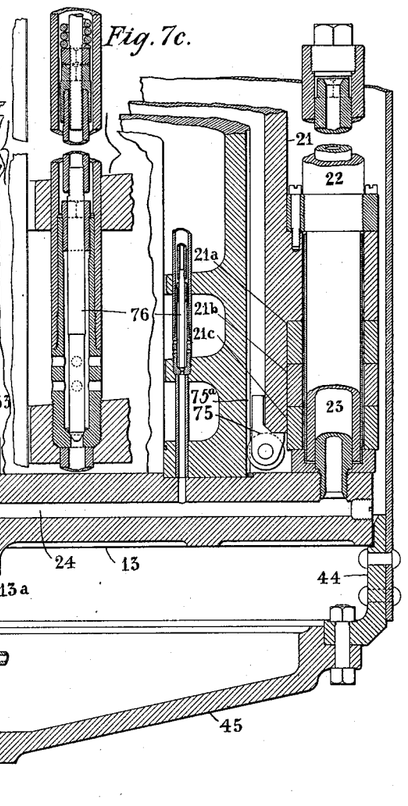

When the gun stops after recoil before it has reached loading position, a spring loaded valve 76, (shown in Fig. 7ᶜ) is tripped by lifting the lever 77 a few inches. This lever is shown in Fig. 3. Tripping this valve allows the gun to descend quickly to loading position. The valve is loaded by a spring with such pressure that should there be an overload of pressure on the liquid during recoil the valve opens automatically to relieve this overload.

The gun 3 carries an elevating band 78 to which the elevating rods 79 are trunnioned at their upper ends. At their lower ends they connect by pins 80 set in sliding shoes 81, with fixed bearings 82 secured to the carriage body 6. These fixed bearings 82 have circular paths for shoes 81 whose centers are in the axis of the trunnions 83 at the upper end of the elevating rods 79. To the shoes 81 are secured arcs 84 to show the angle of elevation of the gun, which is indicated by the pointers 85 fixed on the bearing pieces 82 in which the shoes travel as the elevation of the gun is changed, to do which cranks 86 on the ends of the shaft 87 (see Fig. 6), drive pinions 88 keyed to the shaft 87. These pinions drive the gears 89 keyed to the elevating screws 90. These screws have fixed bearings in the shaft 91 and turn in the nuts 92. These nuts are trunnioned in the sliding shoes 81 which move up and down to change the elevation of the gun when the screws are turned.

The elevating rods 79 may be like the simple rods used in other carriages but when so made have great strains put upon them when the gun descends under the action of recoil, as during the short time of recoil they have to force the gun to make the partial revolutions required to go back in the path in which it was raised. To avoid these great strains I make these rods extensible. If the gun is raised from loading to firing position at point blank (see Fig. 5) the point x shown at 93ª will pass along the dotted line path 93 to 93ᵇ. The rods 79 do not change their fixed lengths when the gun moves from loading to firing position, but they are constructed to be extended or compressed by heavy axial loads and this change of length permits the gun to descend in a different path from that in which it rises from loading to firing position. When the gun is provided with these adjustable length rods the point $x$ on the muzzle of the gun will describe the path 93 going from point $93^a$ to $93^b$ in passing from loading to firing position, but descends in the path 94 when returning from point $93^b$ to $93^a$. This allows the gun to start back almost directly in the line of fire without undue strain on the rods 79. The construction of these rods which enables them to do this is shown in another application of mine, Serial No. 202,608, application filed April 11, 1904.

Figure 1:
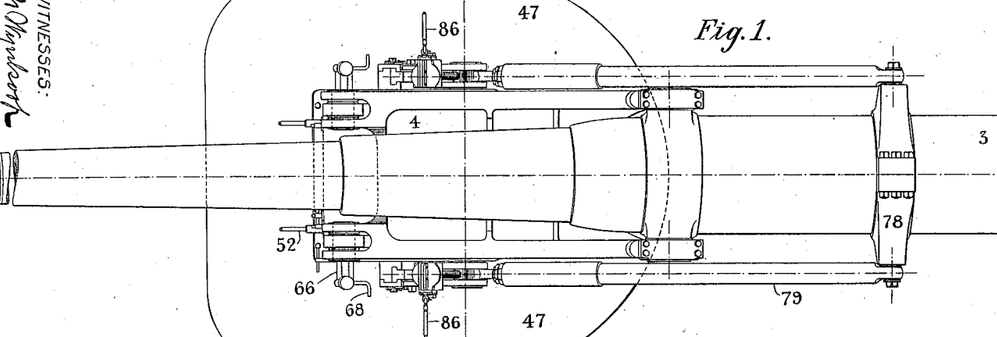
Figures 1 and 2 show respectively the plan and side elevation of a gun in loading position mounted on my carriage with so much of the carriage as appears above the foundation.
Figure 2:
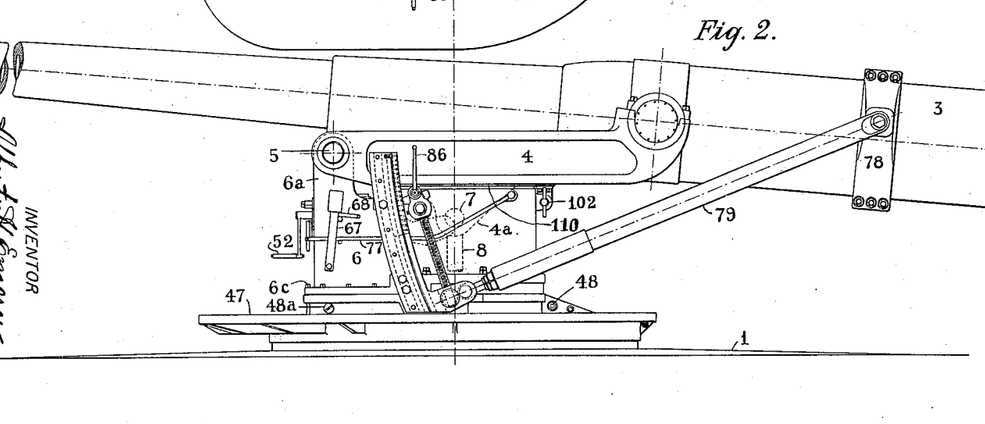
Figure 8:
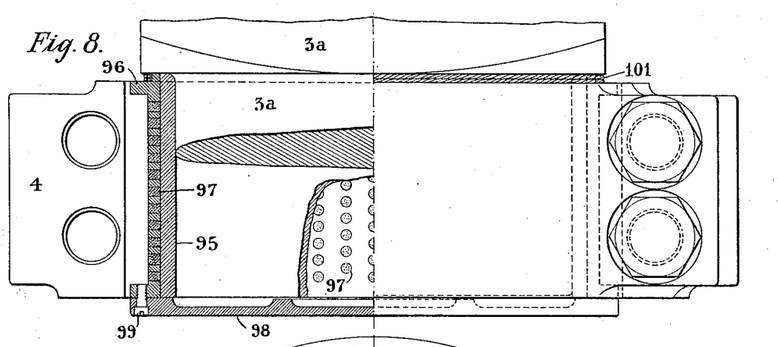
Figs. 8 and 8$^a$ show an improved anti-friction trunnion bearing on an enlarged scale.
Figures 8A, 8B:
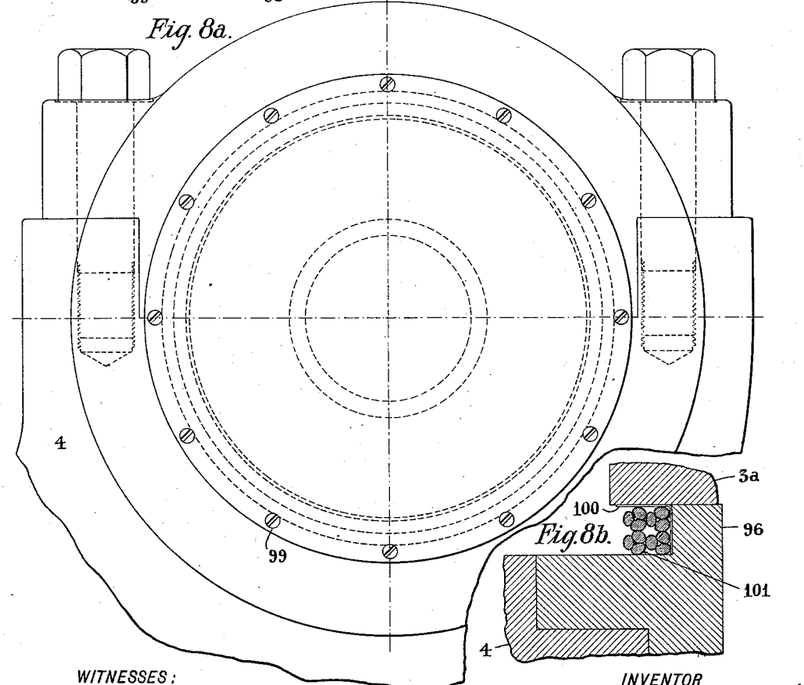

In Figs. 8 and $8^a$, is shown an improved trunnion bearing for guns where $3^a$ shows one of these trunnions partly in elevation and partly in section. This trunnion is fitted with a close fitting polished hardened steel collar 95 resting in bronze bushing 96 which is fitted in the upper end of link 4. It is difficult to provide large guns with trunnions which are hardened ground and polished and keep them in proper condition, besides, these trunnions, in practice, are made with a tolerance of $\pm.01$ in. In order to take in the larger trunnion of, say, nominally 12 in. diameter, the bushing in the carriage would have to be bored to 12.01 in. and then, in mounting a gun, its trunnion may be found to be .01 in. under, instead of .01 over, size, which would leave an opening of .02 in. for dust and water to get in, which would soon spoil the hardened and polished surface, if one has been provided, which, so far as I know, is never done. To avoid this, I make the bushing larger, and then provide for each gun these hardened and polished sleeves 95 which may be put upon the trunnion just before mounting the gun, and being polished slip easily in the lubricated bronze bushing 96 which is kept well lubricated by providing a series of holes 97 filled with felt or other suitable material charged with a good lubricating material, such as vaseline and plumbago. These bearings, to remain in good condition like many others in the carriage should be protected from dust, water, sand, etc., to do which I have provided a packing (shown on a large scale in Fig. $8^b$). The joint between the bushing 96 and the polished bearing 95 is protected at its outer end by a bronze plate 98 secured thereto by screws 99, (see Fig. 8,) which keep dust and water from this end of the joint. At the inner end (see Fig. $8^b$) the joint between the trunnions $3^a$ and the bronze bushing 96 is protected by a brass ring 100 made of thin sheet brass spun in proper form and is best placed in position after the gun is mounted. It should be made in two pieces long enough to overlap each other somewhat when in position. These brass pieces 100 are secured in place by a cord or band 101, of elastic material wound into the groove as shown in Figs. 8 and $8^b$. This cord is saturated with some water proof material which protects it and seals the joint between the plate 100 and the bushing 96. The elastic action of this cord presses plate 100 against the lubricated trunnion bearing $3^a$ sufficiently to keep dust and water from going into this end of the joint. There are several places in the carriage where this packing should be used to protect the sliding bearings from dust and water. Fig. 2 shows a locking pin 102 which passes through holes $6^d$ in lugs on the carriage body and in the piece 103 bolted to the underside of the link 4. It is sometimes used to lock the link against rising.

In use it is desired to raise the gun very quickly from loading to firing position, and to bring it quickly to rest without shock. When it reaches the firing position, I provide a pair of hydraulic buffers 104 shown in Fig. 5, one in section and one in elevation and shown in Fig. 7 on a larger scale in section. They are screwed in stems 105 secured to the lower head 13 of the spring cylinder 12 and have long piston rods 106 with shoulders 107 at the upper ends. Throttling grooves are put in these rods as shown by the dotted line $106^a$ in Fig. 7. When the gun is raised and nears the firing position, the spring piston 10 strikes the shoulders 107 of the piston rods of these buffers and is quickly brought to rest without shock at exactly the right place. The piston rod 8 is inclined to the axis of the spring cylinder part of the time and when thus inclined gives a horizontal thrust on the spring piston 10—which is taken on one of the guide bars 108, shown in elevation in Fig. 5. Rollers 109 may be used to reduce the sliding friction caused by this thrust.

The upper end of the carriage body 6 has a shallow circular groove, in which is arranged a large rubber ring 110, of rectangular section (see Figs. 2, 3 and 6). This ring projects above the carriage body 6 sufficiently far to close the opening between the link 4 and the carriage body 6 when the gun is in loading position, the lower web of this link having its under face $4^b$ (see Fig. 3) so dressed that when the gun is in loading position this face of the link will set on the rubber ring 110, thus making a tight joint to keep out dirt and water, and the thickness of the ring is such that it is somewhat compressed when the gun is in loading position, but should the gun descend too quickly, it acts as a heavy buffer to quickly stop the downward movement of the gun when it goes below its proper loading position.

Having thus described my invention, the following is what I claim as new therein and desire to secure by Letters Patent:

1. In an elevating gun carriage, having a vertical supporting and rotating cylinder which carries the carriage body and gun and contains the recoil press, a weight accumulator having communication with said recoil press and storing part of the work of recoil.

2. In a recoil gun carriage having a vertical supporting cylinder which carries the carriage body and gun and a recoil press, an accumulator weight constructed with a hydraulic press suitably connected to the recoil press which supplies it with liquid to raise the weight when the gun recoils.

3. In an elevating gun carriage, having a vertical supporting and rotating cylinder which carries the carriage body and gun and contains the recoil press, a weight accumulator constructed with its weight in annular form located around said cylinder, said accumulator being connected to said recoil press.

4. In a recoil gun carriage, having a vertical supporting cylinder which carries the carriage body and gun and a recoil press, an annular accumulator weight around said cylinder; said accumulator weight being provided with rollers which bear against the cylinder to guide the weight in its movements and keep it from tipping.

5. In a recoil gun carriage, having a vertical supporting cylinder which carries the carriage body and gun and a recoil press, an annular accumulator weight around said cylinder; said accumulator weight being provided with rollers and said cylinder being provided with grooves in which the rollers run, to keep the accumulator weight from tipping and cause it to rotate with said cylinder.

6. In a recoil gun carriage having a vertical supporting cylinder which carries the carriage body and gun and a recoil press, an annular accumulator weight around said cylinder, said weight being constructed with a hydraulic press suitably connected to the recoil press which supplies it with liquid to raise the weight when the gun recoils.

7. In a recoil gun carriage having a vertical supporting cylinder which carries the carriage body and gun and a recoil press, an annular accumulator weight around said cylinder constructed with a pair of hydraulic presses suitably connected with the recoil press which supplies them with liquid to raise the weight, when the gun recoils.

8. In an elevating gun carriage having a vertical supporting cylinder which carries the carriage body and gun and contains a recoil and elevating press, an annular accumulator weight around said cylinder and having bearings thereon and guided in its vertical movements thereby.

9. In an elevating gun carriage having a vertical supporting cylinder which carries the carriage body and gun and contains a recoil and elevating press, an annular accumulator weight around said cylinder guided in its movements thereby, said weight being constructed with a hydraulic press suitably connected with the recoil press which supplies liquid to raise the weight when the gun recoils.

10. In an elevating gun carriage having a vertical supporting cylinder which carries the carriage body and gun and contains a recoil and elevating press, an annular accumulator weight around said cylinder, said weight being constructed with a pair of hydraulic presses suitably connected to the recoil press, which supplies them with liquid to raise the weight when the gun recoils.

11. In an elevating gun carriage having a supporting cylinder 12 which carries the carriage body, the gun, elevating mechanism, and an annular accumulator weight around said cylinder; the elevating and recoil press constructed with two concentric rams, the inner connected directly to the accumulator press and the outer through a throttling valve and suitable passages to a reservoir.

12. In an elevating gun carriage having a supporting cylinder 12 which carries the carriage body, the gun, the elevating mechanism and an annular accumulator weight around said cylinder supported by a pair of presses; the elevating and recoil press constructed with two concentric rams, the inner being connected directly, and the outer through a passage containing a check valve, to the accumulator presses, so that when recoil takes place, liquid can pass from the outer ram to the accumulator presses whenever the pressure in the outer ram is superior to that in the inner ram.

13. In a recoil gun carriage having a vertical supporting and rotating cylinder which carries the carriage body and gun, a weight accumulator, and a hydraulic recoil press suitably connected with said weight accumulator; springs adapted to receive load from the upward movement of the accumulator weight.

14. In an elevating gun carriage having a vertical supporting and rotating cylinder which carries the carriage body, the gun, the annular accumulator weight around said cylinder, and the hydraulic recoil press suitably connected with the weight accumulator; springs adapted to receive load from the upward movement of the accumulator weight.

15. In an elevating gun carriage having a vertical supporting and rotating cylinder which carries the carriage body and gun, a hydraulic recoil press, and an annular weight around said cylinder, suitably connected to said recoil press; springs adapted to receive load from the upward movement of the accumulator weight, said springs being initially loaded.

16. In an elevating gun carriage having a vertical supporting and rotating cylinder which carries the carriage body and gun, a hydraulic recoil press, and an annular accumulator weight around said cylinder suitably connected to said recoil press; springs adapted to receive load from the upward movement of the accumulator weight, said springs being initially loaded and acting only during the latter part of the stroke of the accumulator.

17. In an elevating gun carriage having a vertical supporting and rotating cylinder carrying the carriage body and gun, a hydraulic recoil and elevating press, and a weight accumulator connected with said press; spring latches arranged to catch and hold the accumulator weight at or near its upper limit of motion.

18. In an elevating gun carriage having a vertical supporting and rotating cylinder carrying the carriage body and gun and containing a hydraulic recoil and elevating press; and a weight accumulator connected with said press, spring latches arranged to catch and hold the accumulator weight at or near its upper limit of motion, and suitable tripping devices for the latches to allow the accumulator weight to descend and raise the gun to firing position.

19. In an elevating gun carriage having a vertical supporting and rotating cylinder carrying the carriage body and gun and containing a hydraulic recoil and elevating press, and an annular weight accumulator around said cylinder and connected with said press; spring latches arranged to catch and hold the accumulator weight at or near its upper limit of motion.

20. In an elevating gun carriage having a vertical supporting and rotating cylinder carrying the carriage body and gun and containing a hydraulic recoil and elevating press and an annular weight accumulator around said cylinder, connected with said press; spring latches arranged to catch and hold the accumulator weight at or near its upper limit of motion, and suitable tripping devices for the latches to allow the accumulator weight to raise the gun to firing position.

21. In an elevating gun carriage, a vertical cylinder 12 which carries the carriage body and gun and contains a hydraulic elevating and recoil press, said cylinder being formed with an annular chamber constituting a reservoir for said press.

22. In an elevating gun carriage, a vertical cylinder 12 which carries the carriage body and gun, said cylinder being formed with upper and lower flanges and an inner lining which with the main wall of the cylinder forms an annular reservoir to supply the elevating and recoil presses.

23. In an elevating gun carriage, a vertical cylinder 12 which carries the carriage body and gun and contains a hydraulic elevating and recoil press in combination with an annular chamber formed by the main wall of said cylinder, flanges thereon, and an inner lining between said flanges, said chamber forming a reservoir for said press.

24. A recoil gun carriage, having a vertical supporting and rotating cylinder which carries the carriage body, gun and recoil press, with an annular chamber providing a reservoir for said recoil press, said cylinder having a lower supporting head formed with passages to connect said reservoir with the recoil press or presses.

25. In an elevating gun carriage, a vertical supporting and rotating cylinder, the carriage body and gun, and the elevating and recoil press carried by said cylinder, and an annular reservoir concentric with said cylinder; said cylinder being constructed with a lower head, which contains passages connecting said reservoir with said press.

26. In a recoil gun carriage, a vertical supporting and rotating cylinder, the carriage body and gun carried by said cylinder, a supporting curb which contains said cylinder, the guiding rollers 49 for said cylinder, the removable plate 46, constructed in a plurality of parts, providing a roller path, for the guiding rollers 49, covering the space between said cylinder and the supporting curb, and having gear teeth, and traverse mechanism having a pinion working in said gear teeth to rotate the gun carriage; said plate 46 being arranged and adapted to be removed to give access to the rollers 49 without dismounting the gun.

27. In combination with an elevating gun carriage having a carriage body with closed side walls and an open top and an elevating link connected with said carriage and covering the open top of the carriage body when the link is down; an elastic ring interposed between the carriage body and elevating link closing the opening between them and supporting the gun in loading position.

28. In a gun carriage, in combination with relatively rotating parts, a joint between said parts, having a protecting groove, a thin plate 100 placed in said groove to tightly cover the joint and an elastic band 101 holding the plate in position.

29. In an elevating gun carriage having a link system which raises and lowers the gun, suitable counter balancing springs, a spring piston, a spring cylinder on which the carriage body rests, a pair of hydraulic buffers secured to the lower head of the spring cylinder, with piston rods 106 having shoulders 107 against which the spring piston strikes to stop the upward motion of the gun when it reaches firing position.

30. In an elevating gun carriage having a link system which raises and lowers the gun, suitable counter balancing springs, a spring piston, a spring cylinder on which the carriage body rests, constituting an oil reservoir, a pair of hydraulic buffers set in the oil in said cylinder and secured to the lower head of the spring cylinder and piston rods 106 having shoulders 107 against which the spring piston strikes to stop the upward motion of the gun when it reaches firing position.

The foregoing specification signed this 18th day of February 1905.

ALBERT H. EMERY.

In presence of—
ARTHUR C. TATE,
CARRIE L. McCLUNE.

Copies of this patent may be obtained for five cents each, by addressing the "Commissioner of Patents, Washington, D. C."